(12) United States Patent
Shyu et al.

(10) Patent No.: US 8,371,714 B2
(45) Date of Patent: Feb. 12, 2013

(54) FRESNEL LED LENS AND LED ASSEMBLY THEREOF

(75) Inventors: San-Woei Shyu, Taipei (TW); Yi-Min Chen, Taipei (TW)

(73) Assignee: Lan-Yang Investment Co., Ltd., Taipei (TW)

( * ) Notice: Subject to any disclaimer, the term of this patent is extended or adjusted under 35 U.S.C. 154(b) by 218 days.

(21) Appl. No.: 12/748,755

(22) Filed: Mar. 29, 2010

(65) Prior Publication Data
US 2010/0246176 A1  Sep. 30, 2010

(30) Foreign Application Priority Data
Mar. 30, 2009  (TW) ................................ 98205027 U

(51) Int. Cl.
*F21V 5/04*  (2006.01)
(52) U.S. Cl. ........................................ 362/244; 362/332
(58) Field of Classification Search .......... 362/235–237, 362/244, 326, 332
See application file for complete search history.

(56) References Cited

U.S. PATENT DOCUMENTS

| | | | |
|---|---|---|---|
| 6,170,971 B1 * | 1/2001 | Godbillon ..................... | 362/543 |
| 6,726,859 B2 | 4/2004 | Suzuki et al. | |
| 7,192,166 B2 * | 3/2007 | Shimura ....................... | 362/331 |
| 8,042,975 B2 * | 10/2011 | Shyu et al. ................... | 362/333 |
| 2002/0025157 A1 | 2/2002 | Kawakami | |
| 2007/0034890 A1 | 2/2007 | Daschner et al. | |
| 2007/0275344 A1 | 11/2007 | Liu | |
| 2008/0158854 A1 | 7/2008 | Matsui | |
| 2010/0061090 A1 * | 3/2010 | Bergman et al. .............. | 362/231 |

FOREIGN PATENT DOCUMENTS

| | | |
|---|---|---|
| EP | 1091167 | 4/2001 |
| JP | 2005257953 | 9/2005 |
| TW | M347534 | 9/2008 |
| TW | M347533 | 12/2008 |

* cited by examiner

*Primary Examiner* — Alan Cariaso
(74) *Attorney, Agent, or Firm* — Muncy, Geissler Olds & Lowe, PLLC

(57) ABSTRACT

A Fresnel light emitting diode (LED) Lens and a LED Assembly thereof are provided. The Fresnel LED Lens is a lens disposed with a plurality of Fresnel optical surfaces. Each Fresnel optical surface includes a zone area having a plurality of drafts with vertical shape. Each Fresnel optical surface is arranged linearly along a center of a corresponding LED, and each Fresnel optical surface can used to focus light emitted from a LED chip so as to generate a quasi-circle distribution pattern of light with uniform light intensity and satisfy special optical requirements. A LED assembled formed by the Fresnel LED lens and a corresponding LED is used as a light source applied to illumination, mobile phone flashlights or camera flashlights.

4 Claims, 7 Drawing Sheets

FRESNEL LED LENS AND LED ASSEMBLY THEREOF

BACKGROUND OF THE INVENTION

The present invention relates to a Fresnel LED lens and a LED assembly thereof, especially to a Fresnel LED lens with a plurality of Fresnel optical surfaces that is arranged linearly, and it can be assembled with other components to form a light source to apply to illumination, flashlights of mobile phones or cameras.

LED with features of low voltage, low power consumption and long operation life has been broadly applied to indicators, illuminators and so on. Compared with conventional light sources, light emitted from the LED chip is scattered. Thus optical lenses are required to concentrate light in small area or to uniformize light in large area. In lens design of LED, there are two lens types—primary optical lens and secondary optical lens. The primary optical lens is a lens directly packaged on the LED chip and it is used for concentrating light. The secondary optical lens is an LED array formed by signal chip or a plurality of LED chips, and it is used for spreading or unifying light beams. As to the design of the secondary optical lens, Fresnel lens is used so as to reduce thickness of the secondary optical lens. The Fresnel lens with a single LED is shown in FIG. 1 and FIG. 2, light is emitted from a LED 21, concentrated by a Fresnel lens 23, and projected onto a target, as revealed in JP 2005257953, Taiwan Pat. No. M347533, M347534 and U.S. Pat. No. 6,726,859. The Fresnel lens with a LED array is shown in FIG. 3 and FIG. 4, as revealed in US2007/0275344, US2008/0158854, US2002/0025157, US2007/0034890, EP1091167 etc.

In order to meet requirements of power saving and compact design, LED is applied to flashlights of digital still cameras, PC cameras, network cameras, mobile phones etc. The LED lights or flashlight applied to such products are formed by a single LED or a LED array having a plurality of LED. Then a secondary optical lens is added so as to enable illumination and light intensity as uniform as possible. The light distribution pattern requires uniform light intensity and quasi-circle distribution pattern is most suitable to be applied to lighting or flashlights. The Fresnel-type secondary optical lens makes light emitted from LED achieve maximum efficiency. Thus there is a need to provide a secondary optical lens formed by a Fresnel lens that generates quasi-circle distribution pattern and a LED assembly thereof to apply to lighting, mobile flashlights or camera flashlights.

SUMMARY OF THE INVENTION

Therefore it is a primary object of the present invention to provide a Fresnel LED lens and a LED assembly thereof. The LED assembly includes a plurality of LED arranged in a line at an equal interval, a circuit board for mounting the plurality of LEDs, and a Fresnel LED lens for concentrating light and forming a quasi-circle distribution pattern with uniform light intensity. The Fresnel LED lens is made from optical material and it has a source-side optical surface and an object-side optical surface. Both optical surfaces are flat surfaces. Moreover, the object-side optical surface is disposed with a plurality of Fresnel optical surfaces corresponding to the LED. Each central axis formed by a center of each LED connected with a center of a corresponding Fresnel optical surface is parallel to one another. Furthermore, the Fresnel convex surface is aspherical or spherical surface and it has a zone area having a plurality of drafts with vertical shape and equal zone pitch. The Fresnel convex surface satisfies the following conditions:

$$0.7 \leq \frac{f_s}{r_n} \leq 2.2 \tag{1}$$

$$0.1 \leq (N_{d2} - 1)\frac{d_2}{f_s} \leq 1.25 \tag{2}$$

$$\sqrt{\left(\frac{\phi_x - \omega_x}{\pi}\right)^2 + \left(\frac{\phi_y - \omega_y}{\pi}\right)^2} \cdot f_g \leq 0.6 \tag{3}$$

wherein:

$$f_g = \left|\left(\frac{1}{R_1} - \frac{1}{R_F}\right) \cdot f_s\right| \tag{4}$$

$$\omega_x = \tan^{-1}\left(\frac{D}{d0 + d1 + d2 + Lx}\right) \tag{5}$$

$$\omega_y = \tan^{-1}\left(\frac{D}{d0 + d1 + d2 + Ly}\right) \tag{6}$$

wherein $f_s$ is effective focal length of the lens, $d_0$ is thickness of the LED chip, $d_1$ is thickness of seal gel on the central axis, $d_2$ is thickness of the LED lens on the central axis, $r_n$ is radius of a last draft of a Fresnel optical surface R2, $2\phi_x$ (deg.) is an angle of a place where light intensity is half highest light intensity ($I_{1/2}$) in the X direction of the light emitted from the Fresnel LED lens, $2\phi_y$ (deg.) is an angle of a place where light intensity is half highest light intensity ($I_{1/2}$) in the Y direction of the light emitted from the Fresnel LED lens, 2 Lx is length of the LED chip in the X direction, 2 Ly is length of the LED chip in the Y direction, fg is a equivalent focal length of the Fresnel LED lens, $R_1$ is a radius of the source-side optical surface, $R_F$ is a radius of the object side optical surface, and D is a maximum radius of a single Fresnel optical surface on the Fresnel LED lens.

For convenience of use, the Fresnel lens of the present invention can be made from optical glass or optical glass.

It is another object of the present invention to provide a LED assembly that includes at least two LED that is assembled on the circuit board linearly at an equal interval. Each central axis formed by a center of each LED connected with a center of a corresponding Fresnel optical surface is parallel to one another. The light pattern of the LED assembly is quasi-circle distribution pattern. In the cross section of the light pattern, the ratio of the length of the short axis to that of the long axis is larger than 0.8, or the ratio of the length of the long axis to that of the short axis is smaller than 1.25, as the following equation:

$$0.8 \leq \kappa = \frac{\phi_y}{\phi_x} \leq 1.25 \tag{7}$$

wherein $2\phi_x$ (deg.) is an angle of a place where light intensity is half of highest light intensity ($I_{1/2}$) in the X direction of the light emitted from the Fresnel LED lens, $2\phi_y$ (deg.) is an angle of a place where light intensity is half of highest light intensity ($I_{1/2}$) in the Y direction of the light emitted from the Fresnel LED lens, $\kappa$ is ratio of $\phi_y$ to $\phi_x$.

It is a further object of the present invention to provide a LED assembly that includes a Fresnel LED lens, generates a quasi-circle distribution pattern and satisfies following condition (ratio of luminous flux is larger than 60%):

$$\eta = \frac{\beta}{\sum_{i=1}^{n} \alpha_i} \geq 60\% \quad (8)$$

wherein $\alpha_i$ is luminous flux of light emitted from ith LED, $$\sum_{i=1}^{n} \alpha_i$$

is total luminous flux of light emitted from a number n of LED, $\beta$ is luminous flux at infinity ($100 \times f_s$) of the object side without consideration of attenuation.

Thereby the Fresnel LED lens and the LED assembly thereof according to the present invention produce a quasi-circle distribution pattern and satisfy the condition that the ratio of luminous flux is larger than 60%. Moreover, the LED assembly features on thin thickness so as to be applied to lighting devices or flashlights of mobile phones and cameras.

DETAILED DESCRIPTION OF THE PREFERRED EMBODIMENT

Figure 1:
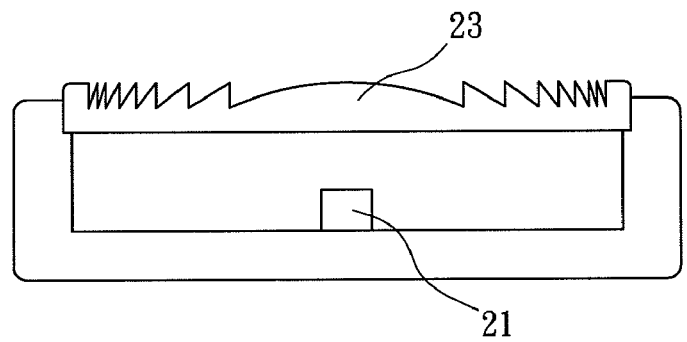
FIG. 1 is a LED assembly with a Fresnel lens and a LED of a prior art.
Figure 2:
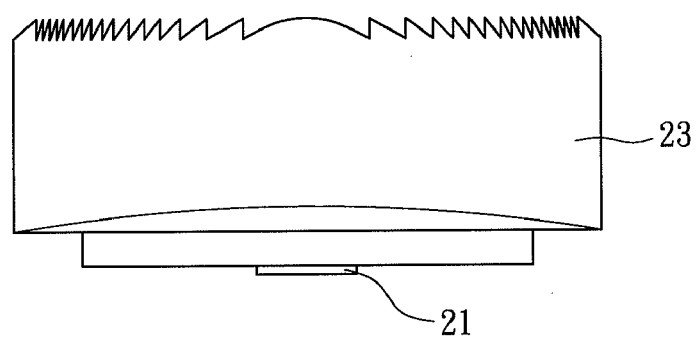
FIG. 2 is a LED assembly with a Fresnel lens and a LED of a prior art.
Figure 3:
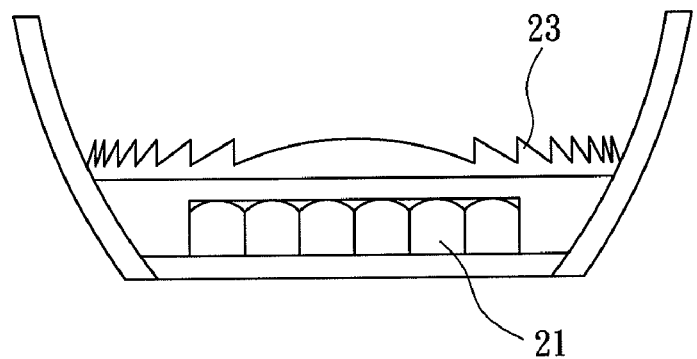
FIG. 3 is a LED assembly having a Fresnel lens and a LED array of a prior art.
Figure 4:
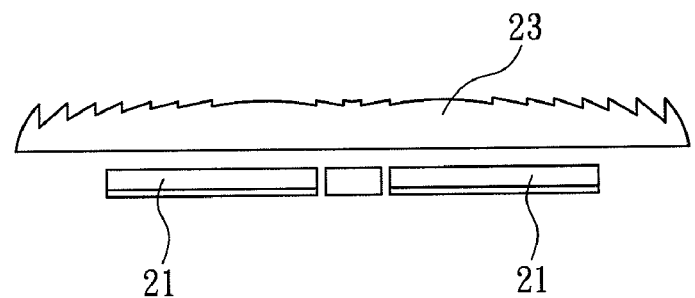
FIG. 4 is a LED assembly having a Fresnel lens and a LED array of a prior art.
Figure 5:
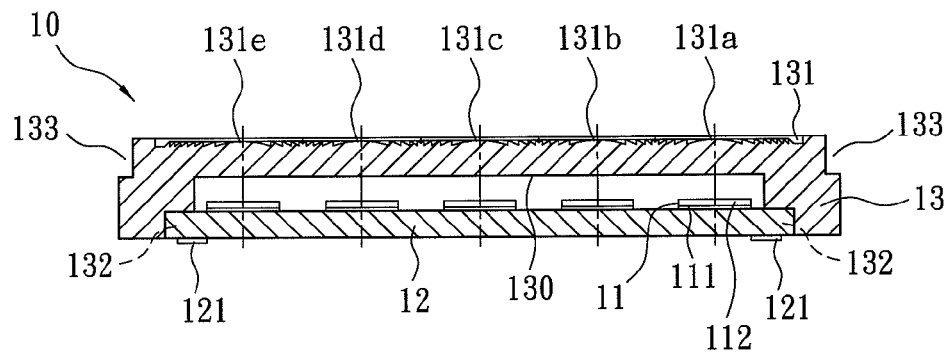
FIG. 5 is a lateral cross sectional view of an embodiment of a LED assembly according to the present invention.

Refer to FIG. 5, a LED assembly 10 of the present invention includes a plurality of LEDs 11 arranged in a line at an equal distance, a circuit board 12 and a Fresnel LED lens 13. The Fresnel LED lens 13 has a source-side optical surface 130 and an object-side optical surface 131. The object-side optical surface 131 is disposed with a plurality of Fresnel optical surfaces 131a-131e and the amount of Fresnel optical surfaces is equal to that of the LEDs 11.

Two conductive plates 121 that transmit power to each LED 11 for emitting light are connected to the circuit board 12. Each LED 11 includes a LED chip 111 and seal gel 112, and it can emit light. The light emitted from the LED chip 111 passes through the seal gel 112, air, the source-side optical surface 130 in sequence and then it is concentrated by the Fresnel optical surfaces 131a-131e to form a light beam with quasi-circle distribution pattern.

Figure 6:
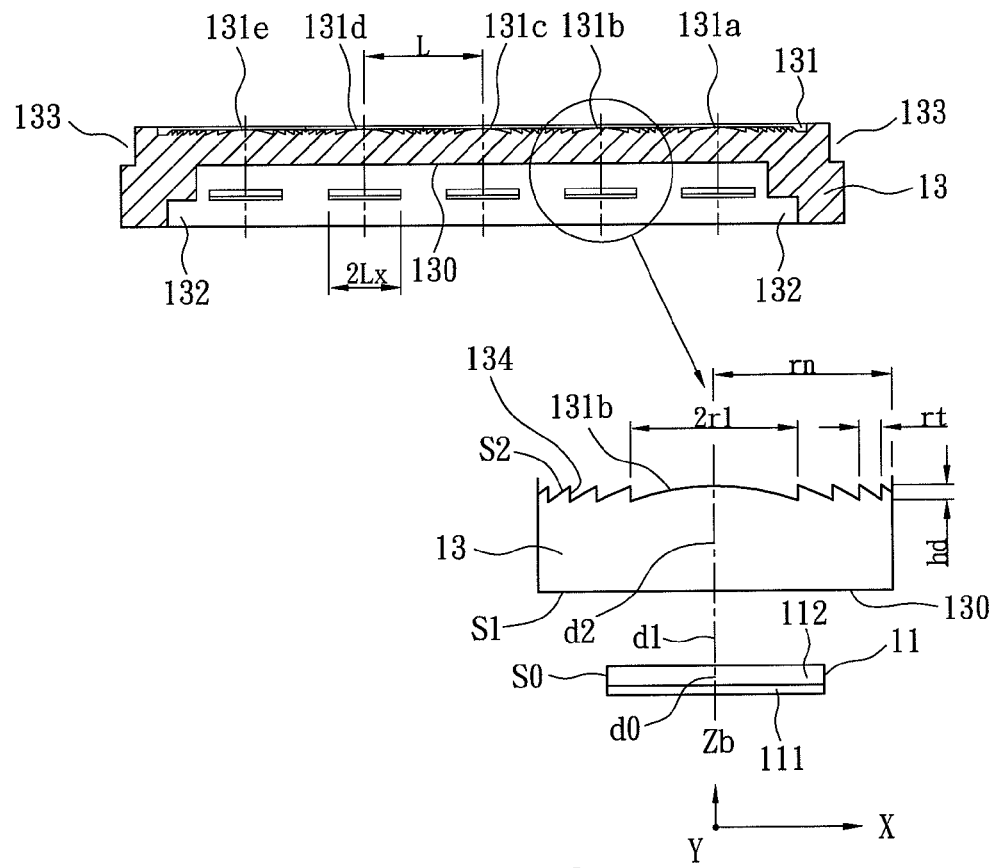
FIG. 6 is a schematic drawing showing a Fresnel lens and a LED assembly according to the present invention.

Refer to FIG. 6, a central axis Zb is formed by a center of the LED 11 connected with a center of the corresponding Fresnel optical surface 131b, d0 is thickness of the seal gel 112, d1 is thickness of air layer, and d2 is distance between the source-side optical surface 130 and the Fresnel optical surface 131b. The Fresnel optical surface 131b is an optical surface having a zone area, and the zone area includes several surrounding drafts. Each draft has vertical shape and equal zone height, wherein $r_1$ is radius of the first draft (the diameter is $2r_1$), $r_n$ is radius of the last draft, $h_d$ is height of the draft, and $r_t$ is an interval between two adjacent drafts. The Fresnel optical surface 131b also must satisfy the equation (1) and equation (2).

The material of the seal gel 12 is not restricted while optical resin or silicon gel is often used in the LED 11. The Fresnel LED lens 13 is made from optical glass or optical plastic resin.

Figure 7:
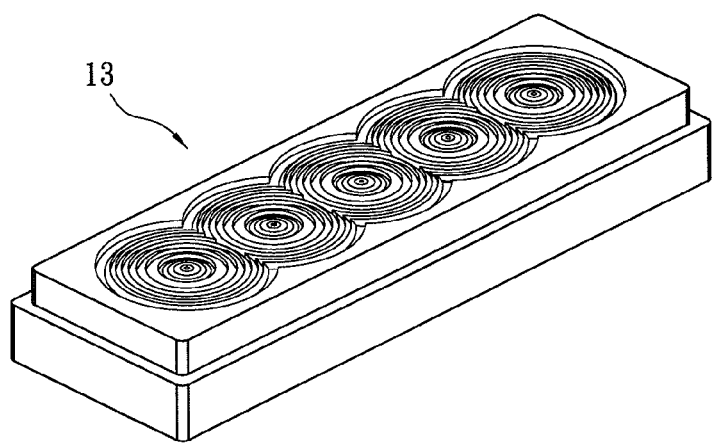
FIG. 7 is a perspective view of an embodiment of a Fresnel LED lens according to the present invention.
Figure 8:
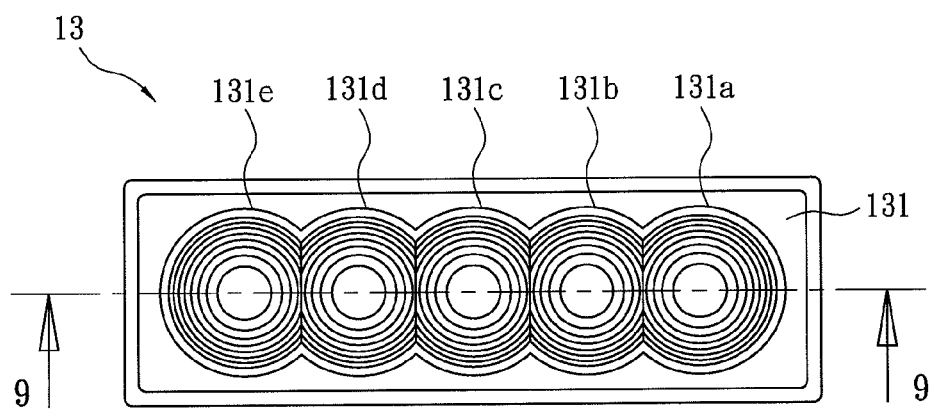
FIG. 8 is a top view of the embodiment in FIG. 7.
Figure 9:
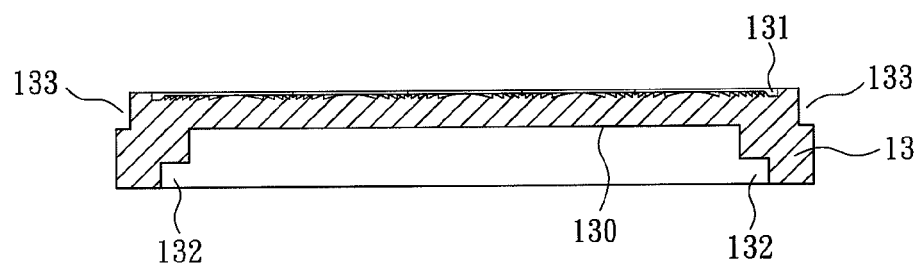
FIG. 9 is a cross sectional view of the embodiment along a 9-9 line in FIG. 8.
Figure 10:
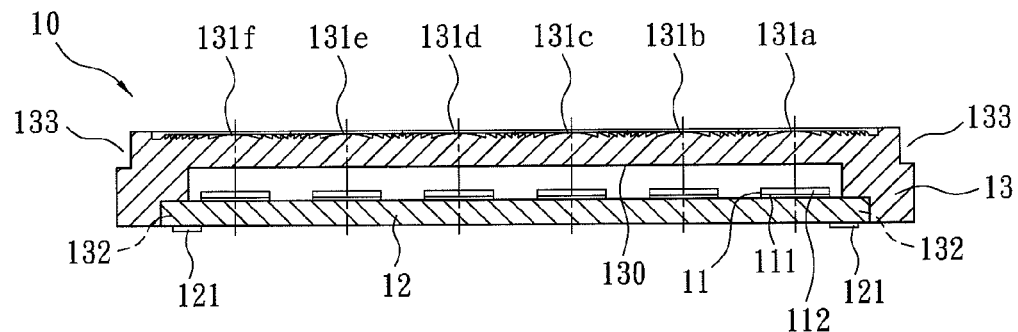
FIG. 10 is a lateral cross sectional view of another embodiment of a LED assembly according to the present invention.
Figure 11:
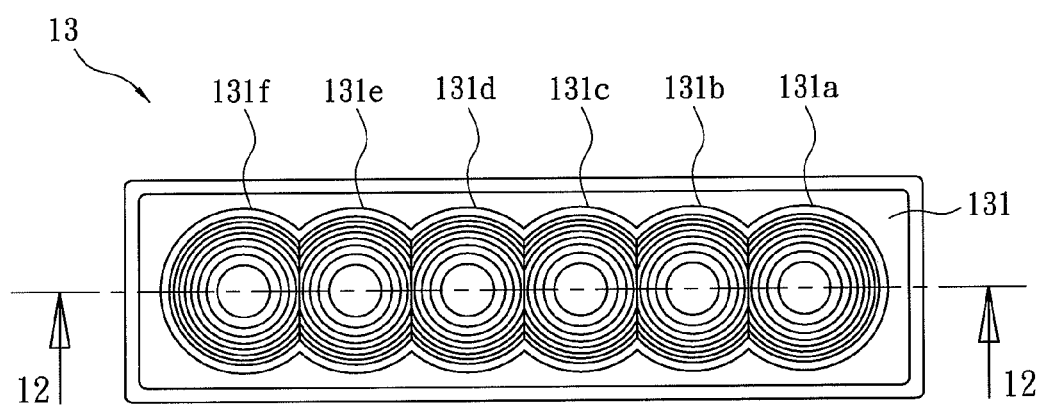
FIG. 11 is a top view of the embodiment in FIG. 10.
Figure 12:
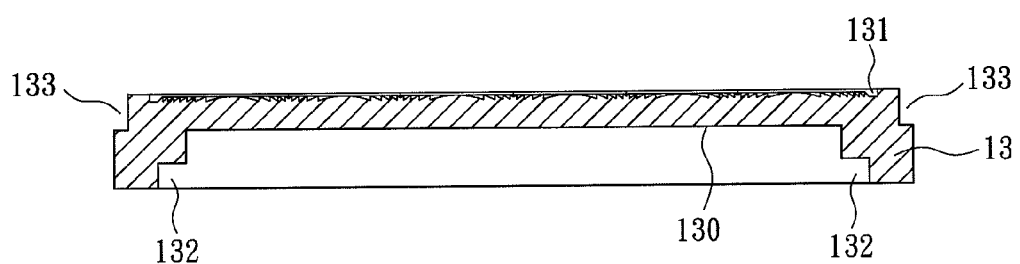
FIG. 12 is a cross sectional view of the embodiment along a 12-12 line in FIG. 11.

Refer from FIG. 7 to FIG. 9, the Fresnel LED lens 13 includes a concave slot 132 and a locking slot 133. The concave slot 132 is used to receive and locate the circuit board 12 so as to make the plurality of LEDs 11 on the circuit board 12 align with a center of the Fresnel optical surfaces 131a-131e of the Fresnel LED lens 13 respectively. The locking slot 133 is used to assemble with cameras or other devices.

The light emitted from the LED chip 111 passes through the Fresnel optical surfaces 131a-131e for concentration and refraction, and then a required quasi-circle distribution pattern of light is formed. The required quasi-circle distribution pattern of light satisfies the condition of $\beta/\alpha \geq 85\%$ at an angle of $2\psi$ ($2\phi_x$ in the X direction and $2\phi_y$ in the Y direction), wherein $\alpha$ is luminous flux emitted from the LED chip and $\beta$ is luminous flux at infinity ($100 \times f_s$) of the object side without consideration of air refraction and scattering.

If the Fresnel optical surface is an aspherical optical surface, the aspherical surface formula is the equation (9):

$$Z = \frac{ch^2}{1+\sqrt{(1-(1+K)c^2h^2)}} + A_4 h^4 + A_6 h^6 + A_8 h^8 + A_{10} h^{10} \quad (9)$$

wherein c is curvature, h is height of the lens, K is conic constant, and $A_4$ to $A_{10}$ respectively are $4^{th}$, $6^{th}$, $8^{th}$, and $10^{th}$ Order Aspherical Coefficients.

The curvature radius $R_F$ of the Fresnel optical surfaces 131a-131e is also defined by the equation (9), wherein Conic Constant is −1 (K=−1) for paraboloid surface, and 0 (K=0) for spherical surface, respectively.

The present invention will be best description by following embodiments. Each of the Fresnel optical surfaces having a zone area, and the zone area includes several surrounding drafts. Each draft has vertical shape and equal zone. The seal gel 12 is made from transparent optical silicon gel with refractive index of 1.41. As to the general LED assembly, other components except the Fresnel LED lens of the present invention are obvious to those skilled in the art. Thus the size and material of each component of the LED assembly, wavelength and emitting angle of LED, patterns, the zone pitch and the zone height of the Fresnel optical surfaces all can be changed, modified and even substituted with equal effect parts.

Embodiment One

Refer to FIG. 5, FIG. 7-FIG. 9, FIG. 13 and FIG. 14, table one includes data of radius R of the seal gel 112 of the LED chip 111, the curvature radius $R_F$ (unit: mm) of the Fresnel optical surfaces 131a-131e, and the on-axis surface spacing di (unit: mm) along a central axis Z from the source side to the object side, respective refractive index ($N_d$), and the effective focal length $f_s$ of the Fresnel optical surface, wherein the surface labeled with * is an aspherical Fresnel optical surface.

TABLE ONE

| Surface No. | R or $R_F$ | d | Nd |
|---|---|---|---|
| S0 | ∞ | 0.626 | 1.410 |
| S1 | ∞ | 0.85 | 1.0 |
| S2* | 2.0 | 0.90 | 1.587 |

*Aspherical Zone Fresnel

The following table two shows respective parameters in the equation (9) of aspherical surface of Fresnel optical surface whose radius is $R_F$, radius $r_1$ of a first Fresnel draft and radius $r_n$ of the last Fresnel draft from the center of the lens, Fresnel zone height $h_d$ and number of Fresnel drafts.

TABLE TWO

| Effective focal length fs = 4.4085 | | | |
|---|---|---|---|
| K | $A_2$ | $A_4$ | $A_6$ |
| Aspherical Surface −1.0000E+00 | 0.0000E+00 | 0.0000E+00 | 0.0000E+00 |
| $h_d$ | $r_1$ | $r_n$ | No. of draft |
| Fresnel Surface(mm) 0.125 | 0.1414 | 4.0 | 8 |

Figure 13:
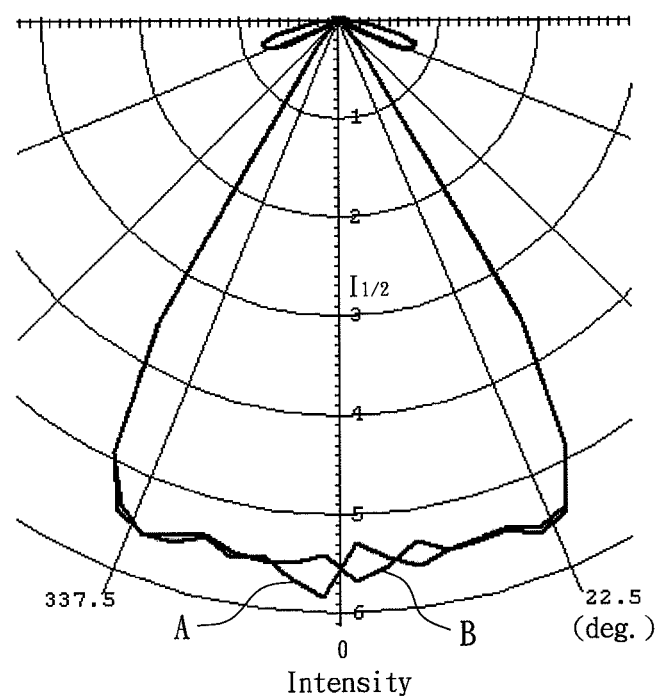
FIG. 13 shows a relationship between light intensity distribution and grazing angle in a polar coordinate system light of an embodiment of a LED according to the present invention.

In this embodiment, the Fresnel LED lens 13 is made from plastic material with refractive index $N_{d2}$ of 1.587 and five Fresnel optical surfaces 131a-131e are disposed on the object-side optical surface 131. The size of the five LEDs 11 is 1.12×1.12 mm, diverge angles of the LEDs 11 are $\omega_x$=31.5° in the X direction and $\omega_y$=31.5° in the Y direction, and α is 6.9 lm. The relationship between LED 11 light intensity distribution and distribution angle in a polar coordinate system is shown in FIG. 13. The five LEDs 11 are disposed on the circuit board 12 in a linear form. The distance L between centers of two adjacent LED 11 is 3.0 (mm). That means the distance between two adjacent Fresnel optical surfaces 131a-131e L is 3.0 (mm). The circuit board 12 is mounted and fixed in the concave slot 132 of the Fresnel LED lens 13. Each central axis Zb formed by centers of each LED 11 connected with center of the corresponding Fresnel optical surfaces 131a-131e is parallel to one another. The five central axis Zb are parallel to one another. The circuit board 12 is connected with external power sources by two conductive plates 121. After the power is applied, the current passes through the conductive plates 121 and the circuit board 12 to make the five LED 11 emit light. After the light is concentrated by the Fresnel optical surfaces 131a-131e of the Fresnel LED lenses 13, angles of a place where light intensity is half of the maximum luminance are 40.5° in the X direction and 35° in the Y direction so that a quasi-circle distribution pattern of the light is formed, and κ>0.8.

Figure 14:
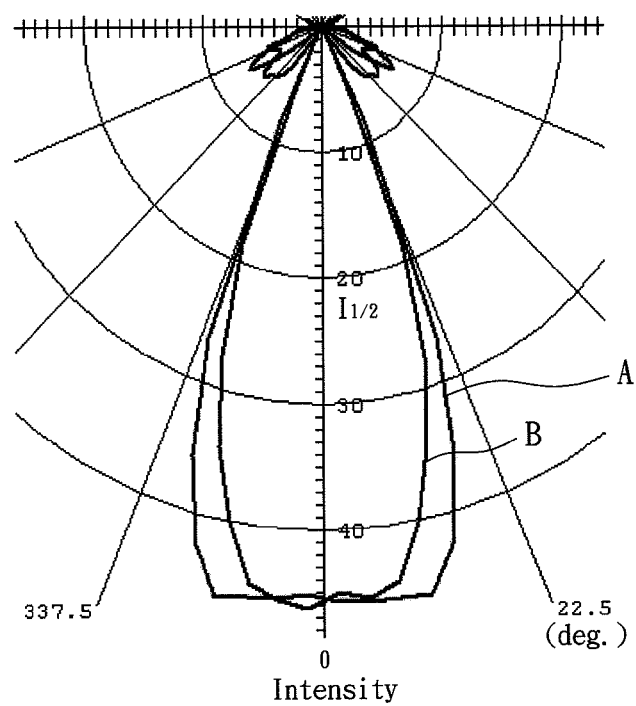
FIG. 14 shows a relationship between light intensity distribution and grazing angle in a polar coordinate system light of an embodiment of a LED assembly according to the present invention.

The relationship between light intensity distribution and distribution angle in a polar coordinate system of light of the LED assembly 10 is shown in FIG. 14. The luminous flux β is 32.5 lm at infinity (100×$f_s$) without consideration of air refraction and scattering. Equation (1), equation (2), equation (3), equation (7), and equation (8) respectively are as following:

$$\frac{f_s}{r_n} = 1.102$$

$$(N_{d2} - 1)\frac{d_2}{f_s} = 0.1198$$

$$\sqrt{\left(\frac{\phi_x - \omega_x}{\pi}\right)^2 + \left(\frac{\phi_y - \omega_y}{\pi}\right)^2} \cdot f_g = 0.5397$$

$$\phi_x = 20.25°$$

$$\phi_y = 17.5°$$

$$\kappa = \frac{\phi_y}{\phi_x} = 0.864$$

$$\eta = \frac{\beta}{\sum_{i=1}^{n} \alpha_i} = 94.2\%$$

Equation (1), equation (2), equation (3), equation (7) and equation (8) are satisfied.

Embodiment Two

Refer from FIG. 10 to FIG. 12, FIG. 15, and FIG. 16, parameters in the following tables—table three and table four are the same with those in table one and table two.

TABLE THREE

| Surface No. | R or $R_F$ | d | Nd |
|---|---|---|---|
| S0 | ∞ | 0 | 1 |
| S1 | ∞ | 0.4 | 1 |
| S2* | 2.7 | 2 | 1.8 |

*Aspherical Zone Fresnel

TABLE FOUR

| Effective focal length fs = 5.4659 | | | |
|---|---|---|---|
| K | $A_2$ | A4 | $A_6$ |
| Aspherical Surface −5.000E−01 | 3.100E−02 | 1.2600E−5 | 7.8000E−8 |
| $h_d$ | $r_1$ | $r_n$ | No. of draft |
| Fresnel Surface(mm) 0.05 | 1.0368 | 5.052 | 27 |

Figure 15:
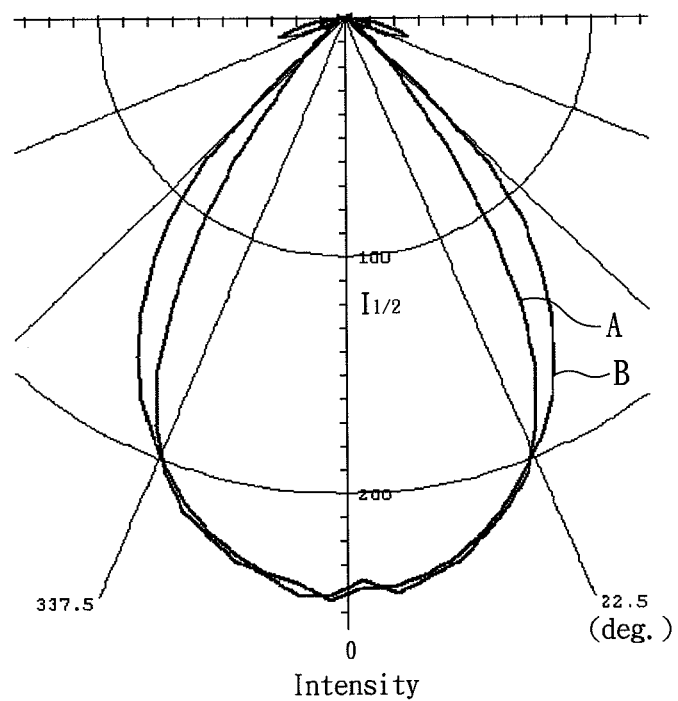
FIG. 15 shows a relationship between light intensity distribution and grazing angle in a polar coordinate system light of another embodiment of a LED according to the present invention.

In this embodiment, the Fresnel LED lens 13 is made from glass with refractive index $N_{d2}$ of 1.8 and six Fresnel optical surfaces 131a-131f are disposed on the object-side optical surface 131. The size of the six LED 11 is 1.85×0.77 mm, diverge angles of the LEDs are $\omega_x$=38.25° in the X direction and $\omega_y=29.25°$ in the Y direction, and $\alpha$ is 78.5 lm. The relationship between LED 11 light intensity distribution and distribution angle in a polar coordinate system is shown in FIG. 15. The six LEDs 11 are disposed on the circuit board 12 in a linear form. The distance L between centers of two adjacent LED 11 is 4.0 (mm). That means the distance between two adjacent Fresnel optical surfaces 131a-131f L is 4.0 (mm). After light emitted from the six LED 11 is concentrated by the Fresnel optical surfaces 131a-131f, angles of a place where light intensity is half of the maximum luminance are 63° in the X direction and 54° in the Y direction so that a quasi-circle distribution pattern of the light is formed and $\kappa > 0.8$.

Figure 16:
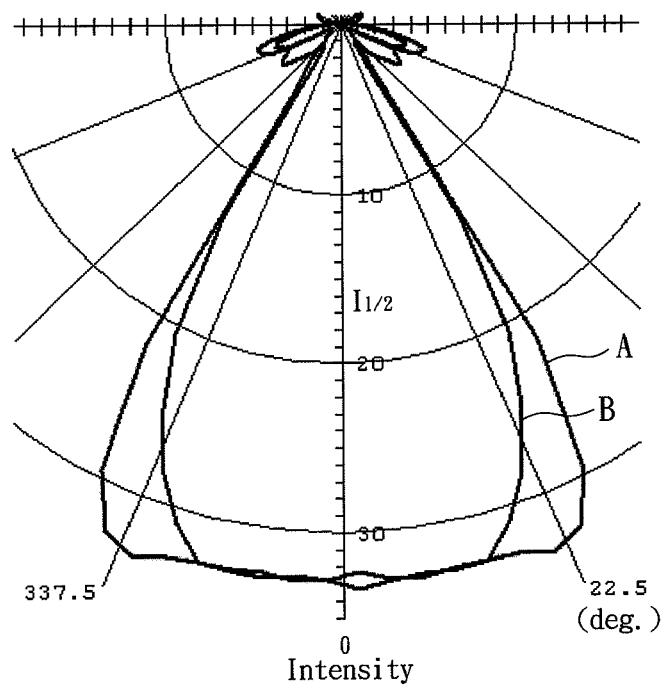
FIG. 16 shows a relationship between light intensity distribution and grazing angle in a polar coordinate system light of another embodiment of a LED assembly according to the present invention.

The relationship between light intensity distribution and distribution angle in a polar coordinate system of light of the LED assembly 10 is shown in FIG. 16. The luminous flux $\beta$ is 326.8 lm at infinity (100×$f_s$) without consideration of air refraction and scattering. Equation (1), equation (2), equation (3), equation (7), and equation (8) respectively are as following:

$$\frac{f_s}{r_n} = 1.153$$

$$(N_{d2} - 1)\frac{d_2}{f_s} = 0.1145$$

$$\sqrt{\left(\frac{\phi_x - \omega_x}{\pi}\right)^2 + \left(\frac{\phi_y - \omega_y}{\pi}\right)^2} \cdot f_g = 0.2744$$

$$\phi_x = 31.5°$$

$$\phi_y = 27.0°$$

$$\kappa = \frac{\phi_y}{\phi_x} = 0.873$$

$$\eta = \frac{\beta}{\sum_{i=1}^{n} \alpha_i} = 69.38.2\%$$

Equation (1), equation (2), equation (3), equation (7) and equation (8) are satisfied.

In summary, the LED assembly 10 with the Fresnel LED lens 13 according to the present invention has high efficiency and provides quasi-circle distribution pattern with uniform light intensity. The applications of the present invention in lighting or camera flashlights etc. are increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A LED assembly, comprising:
   a Fresnel light emitting diode (LED) lens covered over a plurality of LEDs arranged linearly at an equal distance, comprising:
      an object-side optical surface having a plurality of Fresnel optical surfaces, each of the Fresnel optical surfaces having a zone area having a plurality of drafts with vertical shape, the plurality of Fresnel optical surfaces corresponding to the plurality of LEDs and arranged linearly at an equal distance so that each central axis formed by a center of each LED connected with a center of each corresponding Fresnel optical surface being parallel to one another; and
      a source-side optical surface;
   wherein the light emitted from the plurality of LEDs passes through the zone area of each of the Fresnel optical surfaces and a quasi-circle distribution pattern of the light is formed, and the Fresnel optical surface satisfying following conditions:

$$0.7 \leq \frac{f_s}{r_n} \leq 2.2$$

$$0.1 \leq (N_{d2} - 1)\frac{d_2}{f_s} \leq 1.25$$

wherein $f_s$ is effective focal length of the Fresnel LED lens, $r_n$ is radius of a last zone of each the Fresnel optical surface, $d_2$ is thickness of the Fresnel LED lens on the central axis, and $N_{d2}$ is refractive index of the Fresnel LED lens, and
   a circuit board;
      the improvement comprises the plurality of LEDs are arranged linearly at an equal distance on the circuit board so that a central axis formed by a center of each LED connected with a center of each corresponding Fresnel optical surface is parallel to one another; the LED assembly satisfies following condition:

$$0.8 \leq \kappa = \frac{\phi_y}{\phi_x} \leq 1.25$$

wherein $2\phi_x$ is an angle of the place where light intensity is half of highest light intensity in the X direction of the light emitted from the Fresnel LED lens, and $2\phi_y$ is an angle of the place where light intensity is half of highest light intensity in the Y direction of the light emitted from the Fresnel LED lens.

2. The LED assembly as claimed in claim 1, wherein the LED assembly satisfied following condition:

$$\eta = \frac{\beta}{\sum_{i=1}^{n} \alpha_i} \geq 60\%$$

wherein $\alpha_i$ is luminous flux of light emitted from ith LED, $$\sum_{i=1}^{n} \alpha_i$$

is total luminous flux of light emitted from a number n of LED, $\beta$ is luminous flux at infinity (100×$f_s$) of the object side without consideration of attenuation.

3. The LED assembly as claimed in claim 1,
   wherein the Fresnel LED lens further satisfied following conditions:

$$\sqrt{\left(\frac{\phi_x - \omega_x}{\pi}\right)^2 + \left(\frac{\phi_y - \omega_y}{\pi}\right)^2} \cdot f_g \leq 0.6$$

-continued wherein $$f_g = \left|\left(-\frac{1}{R_F}\right) \cdot f_s\right|$$

$$\omega_x = \tan^{-1}\left(\frac{D}{d0 + d1 + d2 + Lx}\right)$$

$$\omega_y = \tan^{-1}\left(\frac{D}{d0 + d1 + d2 + Ly}\right)$$

wherein $f_s$ is effective focal length of the Fresnel LED lens, $d_0$ is thickness of the LED chip, $d_1$ is thickness of seal gel on the central axis, $d_2$ is thickness of the Fresnel LED lens on the central axis, $2\phi_x$ (deg.) is an angle of a place where light intensity is half of highest light intensity ($I_{1/2}$) in the X direction of the light emitted from the Fresnel LED lens, $2\phi_y$ (deg.) is an angle of a place where light intensity is half of highest light intensity ($I_{1/2}$) in the Y direction of the light emitted from the Fresnel LED lens, 2Lx is length of the LED chip in the X direction, 2Ly is length of the LED chip in the Y direction, fg is a equivalent focal length of the Fresnel LED lens, $R_1$ is a radius of the source-side optical surface, $R_F$ is a radius of the Fresnel optical surface, and D is a maximum radius of a single Fresnel optical surface of the Fresnel LED lens.

4. The LED assembly as claimed in claim 1, wherein the Fresnel LED lens is composed of plastic optical materials or glass optical materials.

* * * * *